United States Patent [19]
Mallison

[11] Patent Number: 5,317,912
[45] Date of Patent: Jun. 7, 1994

[54] TIRE UNIFORMITY MACHINE CHUCK CHANGING SYSTEM

[75] Inventor: Frank K. Mallison, Akron, Ohio

[73] Assignee: Akron Special Machinery, Inc., Akron, Ohio

[21] Appl. No.: 933,672

[22] Filed: Aug. 24, 1992

[51] Int. Cl.⁵ .......................................... G01M 17/02
[52] U.S. Cl. .......................................... 73/146; 73/8; 483/20
[58] Field of Search .................... 73/146, 7, 8; 483/20

[56] References Cited

U.S. PATENT DOCUMENTS

| | | | |
|---|---|---|---|
| 3,552,200 | 1/1971 | Hermanns et al. | 73/146 |
| 4,805,125 | 2/1989 | Beebe | 364/570 |
| 4,852,398 | 8/1989 | Cargould et al. | 73/146 |
| 5,029,467 | 7/1991 | Cargould | 73/146 |

OTHER PUBLICATIONS

*LC Series Laser Displacement Meter*, Keyence, undated.
*Pneumatic Actuator Series 56*, Airpot Corporation, Norwalk, Conn., undated.
*Bellofram Motorized Type 10 Pressure Regulator*, Bellofram, undated.

Primary Examiner—Richard E. Chilcot, Jr.
Assistant Examiner—Joseph L. Felber
Attorney, Agent, or Firm—Reese Taylor

[57] ABSTRACT

A system for changing the chucks of a tire uniformity machine includes a control which inactivates the main machine hydraulic and electrical system. The control also activates the chuck changing system which includes a small hydraulic power unit and a low set pressure relief valve for raising and lowering the lower chuck assembly and a small gearmotor for rotating the upper chuck assembly to facilitate removal of the upper chuck. The small hydraulic power unit and gearmotor, while mounted on the tire uniformity machine, operate entirely independently thereof for safety purposes.

5 Claims, 1 Drawing Sheet

TIRE UNIFORMITY MACHINE CHUCK CHANGING SYSTEM

BACKGROUND OF THE INVENTION

This invention relates in general to tire uniformity machines and relates in particular to a time-saving, safe chuck changing system for changing the chucks in such machines.

DESCRIPTION OF THE PRIOR ART

Tire uniformity machines are well-known in the art and the grinding of tires on such machines is also well-known. Representative examples of tire uniformity machines may be seen in Beebe U.S. Pat. No. 4,805,125 and Cargould U.S. Pat. No. 5,029,467.

These machines are generally used as part of the overall testing and inspection program conducted during the manufacture of vehicle tires. They generally include a framework and a chucking mechanism whereby the tires to be inspected and/or ground are brought into the machine, engaged by a lower chuck, which chuck is then elevated to engage the tire with the upper chuck, following which the tire is inflated, rapidly rotated on a driven spindle and a loadwheel is moved into and out of engagement with the tread area of the tire for testing purposes as is known in the art.

Production requirements require these chucks to be changed frequently due to wear, damage, different tire size requirements, etc. This is a very difficult job for several reasons. For one thing, the very weight of the chucks make them difficult to handle. For another thing, the working area within the framework of the tire uniformity machine is constricted, making the chucks awkward to handle and, of course, their weight compounds that problem.

As a result, many maintenance personnel use the hydraulic power of the tire uniformity machine itself, i.e., the hydraulic power which raises the lower chuck during operation into chucking position, to assist in handling the chucks during the chuck changing operation.

This approach raises significant safety problems. For one thing, most machines, due to OSHA standards, are posted indicating personnel should not reach into or be within the confines of the machine when main machine power is on. Naturally, if the basic chucking hydraulic power is employed during the chuck changing operation, the operator necessarily is fully or partially within the machine framework during that period.

Furthermore, this is a dangerous operation because some other sequence in operation of the tire uniformity machine could inadvertently become activated while the person is in the machine. For example, centering arms are often used to properly position the tires and they may well inadvertently activate. Inasmuch as they normally swing into the central area of the machine, they may well injure the party changing the chucks. Another example would be where the conveyors which bring the tires into and out of the opening in the machine could be inadvertently activated, creating obvious danger to anyone positioned within the machine.

Finally, the pressure normally used to rapidly raise the lower chuck and the tire into the operational position is relatively high pressure and, when no tire is mounted on the chuck, damage could easily be caused thereto if the chucks strike each other under full power.

Accordingly, it is believed desirable to provide a chuck changing system which overcomes these problems and operates independently of the tire uniformity machine itself and its hydraulic and electrical power so that tire uniformity machine operating power is effectively locked out and operator safety is insured.

SUMMARY OF THE INVENTION

It is, therefore, the principal object of this invention to provide a chuck changing system which operates independently of the machine controls themselves and also independently of the power unit so as to effectively lock out the main operating power during the changing operation.

It is another object of this invention to provide an alternative hydraulic source to enable the lower chuck to be raised slowly during the changing operation.

It is another object of this invention to provide an alternative low speed drive for the spindle of the upper chuck to facilitate rotation thereof during the changing operation.

It accordingly becomes a principal object of this invention to provide a tire uniformity machine chuck changing system of the character above-described with other objects thereof becoming more apparent upon a reading of the following brief specification considered and interpreted in view of the accompanying drawings.

BRIEF DESCRIPTION OF THE PREFERRED EMBODIMENTS

Figure 1:
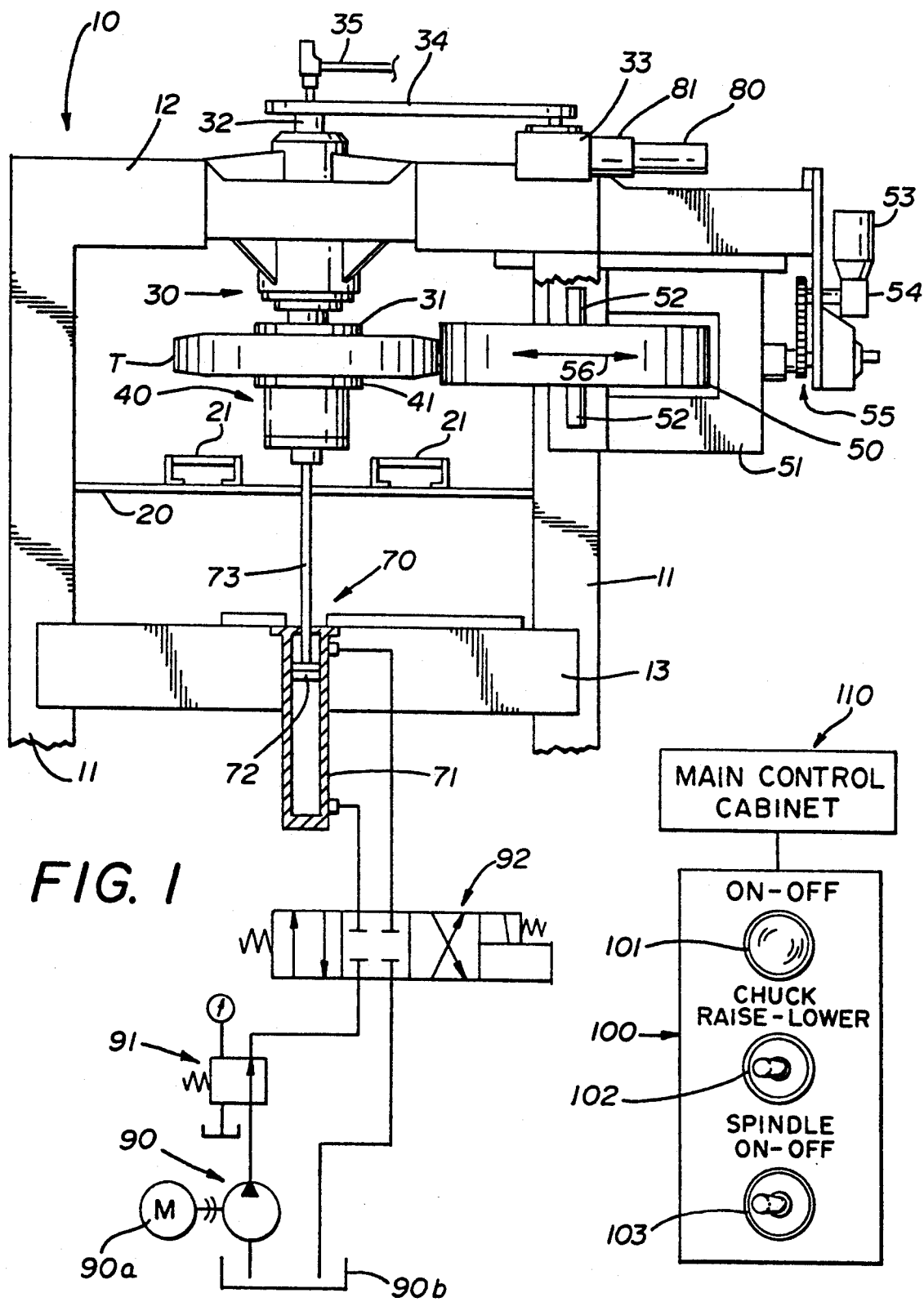
FIG. 1 is an elevational view of a tire uniformity machine, partially in section and partially schematic, illustrating the improved chuck changing system.

Referring then to FIG. 1 of the drawings, it will first be seen that the tire uniformity machine, generally indicated by the numeral 10, is essentially conventional in construction and well-known in the art. As such, it will be described in general terms only.

To that end, the tire uniformity machine includes a plurality of upright frame members 11,11 and top and bottom cross frame members 12 and 13, forming a cube-shaped framework for the machine and its various components.

Mounted on this framework is a conveyor 20 of a known type which generally includes a plurality of conveyor rollers 21,21 which enable the tire T to be brought into position between the opposed chucks of the machine and then removed therefrom following testing.

It is well-known in the art that machines of this type generally include a vertically fixed, but rotatable, upper chuck assembly 30 and a vertically movable lower chuck assembly 40.

The upper chuck assembly 30 includes the chuck 31 secured to a spindle 32 which is rotatable during operation of the machine by means of the motor 33 and the chain or belt drive assembly 34, all of which is essentially conventional construction. Inflation means 35 are also provided and generally include a connection to a source of air pressure and communication with the interior of the closed chucks for inflation purposes. This entire arrangement is well-known in the art and will not be further described or illustrated in detail herein.

The lower chuck assembly 40 includes the lower chuck 41 itself which is movable toward and away from the upper chuck assembly 30. To that end, it is associated with a hydraulic cylinder assembly 70 which includes a cylinder 71, piston 72 and piston rod 73. In that way, as tires T are brought into the framework on the conveyor 20 and positioned between the upper and lower chuck assemblies 30 and 40, the lower chuck assembly 40 can be raised to close the two chucks and trap the tire which can then be inflated to the desired pressure. It will be noted that these machines are generally used in a continuous, production line operation where speed is one desirable characteristic. Therefore, the main hydraulic cylinder assembly is designed to quickly raise and lower the lower chuck assembly 40.

A loadwheel 50 is also provided on the framework and is rotationally mounted on spindles 52,52 which are, in turn, mounted on the carriage 51 which can move radially inwardly and outwardly toward and away from the tire T in the direction of the arrow 56 and, thus, into and out of engagement with the tire T. To that end, a reversible motor 53 and gear reduction unit 54 is connected to a chain drive and screw arrangement 55. Thus, once the tire T has been chucked and inflated, the loadwheel 50 can be moved into and out of engagement with it as required.

All of the structure heretofore described is basically conventional and well-known in the art and has, therefore, been essentially illustrated somewhat schematically since one of ordinary skill in this art would readily understand the structure involved.

The improvement of this invention involves the provision of a system which enables the chucks 31 and 41 to be changed by operation of means which are independent of the main controls and activating means of the tire uniformity machine 10.

This system includes essentially a low-volume, hydraulic pump 90 operated by a motor 90a which can be, in a preferred form of the invention, a 110 volt AC motor. This motor 90a is connected to a source of hydraulic fluid 90b which may be the same hydraulic fluid source utilized by the main hydraulic cylinder assembly 70.

The system also includes a small, low horsepower gear motor 80 which is mounted on the frame and is coupled, by way of a clutch 81, to the existing gear box 33 which is, of course, connected to the chain drive 34 which rotates the spindle 32 and upper chuck assembly 30.

The pump 90 is connected to the lower cylinder 71 through a hydraulic pressure relief valve 91 set low so that damage to the chucks cannot occur during the changing operation. Also, a spring centered, solenoid directional valve 92 is linked to the cylinder 71. This is a four-way, three-position valve with all ports blocked in the center position. This arrangement prevents oil from being diverted from source 90b away from main cylinder 71 during the normal operation of the tire uniformity machine itself, but permits that oil to be utilized during the changing operation.

Finally, a control station 100 is employed. This may be either cable-connected for operator convenience or mounted directly on one of the support columns 11 of the machine itself and is connected to the main control cabinet 110.

Control station 100 includes a main on/off switch 101, a chuck raise/lower switch 102, and a spindle on/off switch 103. The main on/off switch 101 disconnects the power to the main tire uniformity machine controls, while the chuck on/off switch 103 operates the chuck changing mechanism per se, as will be described.

In normal operation of the tire uniformity machine 10, fluid from source 90b is freely available to cylinder 71 through valve 92 so that the usual chucking operation may take place. That is, lower chuck assembly 40 can be rapidly raised and lowered during the normally continuous operation of the machine. Similarly, motor 33 and motor 53 are available to rapidly rotate tire T and move carriage 51 in and out to perform the usual testing operation.

In operation of the chuck changing system, it is simply necessary to deactivate the main power to the tire uniformity machine and activate the chuck changing system by the switch 101. It will be noted here that unless the main disconnect for machine power is in the off position, switch 101 will not come on. This insures that the chuck changing system cannot be operated while there is power to the main controls.

Once the main disconnect is activated and switch 101 is on, it is then possible, through the low horsepower motor 80, to rotate the spindle 32 and top chuck assembly 30 by switch 103, if desired and required for access to the usual attachment bolts as well as for alignment purposes. This low speed rotation also facilitates checking runout of the chucks which would be very difficult under the high speed of which the spindle 32 is normally rotated.

It is also possible to operate the cylinder 70 to raise and lower the lower chuck assembly 40 as required by using switch 102. As previously noted, the low pressure of this alternative source makes it possible to raise and lower lower chuck assembly 40 much more slowly and safely than normally.

It will be noted that not only does this system improve safety, it also facilitates the changing operation. For example, provision of the gear motor 80 makes it possible to rotate the upper chuck assembly 30 for access to various bolts, etc., and replaces the usual hand wheel which is usually attached to the input shaft for this purpose.

Furthermore, the low setting on pressure relief valve 91 insures that excessive lifting velocity normally employed is avoided and, therefore, damage to the chucks themselves is avoided while enhancing operator safety.

Finally, it will be noted that in no instance can the main machine components be activated inadvertently when the present system is being employed.

While a full and complete description has been set forth in accordance with the dictates of the Patent Statutes, it should be understood that modifications can be resorted to without departing from the spirit hereof or the scope of the appended claims.

Thus, it should be noted that the present invention could be employed either as original equipment or as a package for retrofitting existing machines.

What is claimed is:

1. A method for changing chucks in a tire uniformity machine having a main control unit, and upper and lower chuck carrying units, the lower chuck carrying unit being movable toward and away from the upper chuck under hydraulic power from a main hydraulic power unit and the upper chuck being rotatably driven, the method comprising:
   a) providing a system control unit connected to the main control unit of the machine and inoperative when the main control unit is powered;
   b) providing a gearmotor coupled to the main gearbox of the machine and to the system control unit;

c) providing a supplemental hydraulic power unit connected to the lower chuck carrying unit and the system control unit;

d) activating the system control unit and inactivating the main control unit of the machine;

e) activating the supplemental hydraulic power unit to position the chuck carrying units for the chuck changing operation;

f) selectively activating the gearmotor to rotate the upper chuck carrying unit to facilitate the chuck changing operation;

g) removing and replacing the chucks; and h) deactivating the system control unit and reactivating the main control unit of the machine.

2. A chuck changing system for use with a tire uniformity machine having upper and lower chuck carrying units, the lower chuck carrying unit being movable toward and away from the upper chuck carrying unit under hydraulic power from a main hydraulic power unit and including a main gearbox and a main operating control, the chuck changing system comprising:

a) a hydraulic pump mounted on the main hydraulic power unit and connected to the source of hydraulic fluid for the main hydraulic power unit;

b) a pressure relief valve in fluid communication with said second pump;

c) a directional valve in fluid communication with said pressure relief valve and the main hydraulic power unit;

d) a gearmotor connected to the main gearbox of the tire uniformity machine;

e) a clutch, interconnecting said gearmotor and the main gearbox of the f) a system control unit connected to the main operating control of the tire uniformity machine whereby the main operating control of the tire uniformity machine may be disabled upon actuation of said system control unit; and g) said system control unit being operatively connected to said directional valve and said gearmotor.

3. A chuck changing system for use with a tire uniformity machine having upper and lower chuck carrying units, the lower chuck carrying unit being movable toward and away from the upper chuck carrying unit under power from a main hydraulic power unit and the upper chuck carrying unit being rotatably driven by a main drive unit, the system comprising:

a) an alternative hydraulic power unit selectively bypassing the main hydraulic power unit to move the lower chuck carrying unit;

b) an alternative drive unit selectively bypassing the main drive unit to rotatably drive the upper chuck carrying unit;

c) a control system operatively connected to said alternative hydraulic power unit and said alternative drive unit; and d) said control system being inoperative when power is on to the main hydraulic power unit and the main drive unit.

4. The chuck changing system of claim 3 wherein said alternative hydraulic power unit includes a low volume hydraulic pump and a motor connected thereto and to said control system.

5. The chuck changing system of claim 3 wherein said alternative drive unit includes a clutch operatively connected to the upper chuck carrying unit and a low horsepower gearmotor connected to said clutch and said control system.

* * * * *

UNITED STATES PATENT AND TRADEMARK OFFICE
CERTIFICATE OF CORRECTION

PATENT NO. : 5,317,912
DATED : June 7, 1994
INVENTOR(S) : Frank K. Mallison

It is certified that error appears in the above-identified patent and that said Letters Patent is hereby corrected as shown below:

In Column 5, line 33, after the words "of the," insert ---tire uniformity machine---.

Signed and Sealed this

Thirtieth Day of August, 1994

Attest:

BRUCE LEHMAN

Attesting Officer

Commissioner of Patents and Trademarks